(12) United States Patent
Umada et al.

(10) Patent No.: US 7,741,386 B2
(45) Date of Patent: Jun. 22, 2010

(54) WATER-BASED INK FOR INKJET PRINTING

(75) Inventors: Akira Umada, Wakayama (JP); Koji Azuma, Wakayama (JP); Nobushige Tanaka, Wakayama (JP); Nobuyuki Takizawa, Wakayama (JP); Takehiro Tsutsumi, Wakayama (JP)

(73) Assignee: Kao Corporation, Tokyo (JP)

( * ) Notice: Subject to any disclaimer, the term of this patent is extended or adjusted under 35 U.S.C. 154(b) by 397 days.

(21) Appl. No.: 11/718,278

(22) PCT Filed: Oct. 27, 2005

(86) PCT No.: PCT/JP2005/020152

§ 371 (c)(1),
(2), (4) Date: Apr. 30, 2007

(87) PCT Pub. No.: WO2006/046759

PCT Pub. Date: May 4, 2006

(65) Prior Publication Data

US 2007/0289485 A1    Dec. 20, 2007

(30) Foreign Application Priority Data

Oct. 29, 2004   (JP) .............................. 2004-315940
Dec. 24, 2004   (JP) .............................. 2004-373036

(51) Int. Cl.
*C09D 11/10* (2006.01)
(52) U.S. Cl. .................... 523/160; 523/161; 526/89; 106/31.13
(58) Field of Classification Search ................. None
See application file for complete search history.

(56) References Cited

U.S. PATENT DOCUMENTS

| | | | |
|---|---|---|---|
| 6,762,217 B2 * | 7/2004 | Wakabayashi et al. | 523/160 |
| 2001/0023265 A1 * | 9/2001 | Hidaka et al. | 523/161 |
| 2001/0025128 A1 | 9/2001 | Gridnev | |
| 2003/0078320 A1 | 4/2003 | Yatake | |
| 2003/0144378 A1 * | 7/2003 | Mizushima et al. | 523/160 |
| 2005/0027036 A1 * | 2/2005 | Takizawa et al. | 523/160 |
| 2005/0075418 A1 * | 4/2005 | Nishiguchi | 523/160 |
| 2005/0113505 A1 * | 5/2005 | Watanabe et al. | 524/458 |

FOREIGN PATENT DOCUMENTS

| | | |
|---|---|---|
| EP | 1 113 051 | 7/2001 |
| EP | 1 291 397 | 3/2003 |
| JP | 3429062 | 5/2003 |

OTHER PUBLICATIONS

U.S. Appl. No. 11/718,347, filed May 1, 2007, Takizawa, et al.

* cited by examiner

*Primary Examiner*—David Wu
*Assistant Examiner*—Vu Nguyen
(74) *Attorney, Agent, or Firm*—Oblon, Spivak, McClelland, Maier & Neustadt, L.L.P.

(57) ABSTRACT

A water dispersion for inkjet printing which contains polymer particles containing a colorant. The polymer constituting the polymer particles is produced by the copolymerization of a monomer mixture in the presence of a-methylstyrene dimer. The water dispersion for inkjet printing and a water-based ink for inkjet printing containing the water dispersion exhibit excellent jetting properties and a high optical density.

7 Claims, No Drawings

WATER-BASED INK FOR INKJET PRINTING

TECHNICAL FIELD

The present invention relates to a water dispersion for inkjet printing, a process for producing the water dispersion, and a water-based ink for inkjet printing containing the water dispersion.

BACKGROUND ART

In inkjet printings, droplets of ink are directly projected onto a recording medium from very fine nozzles and allowed to adhere to the recording medium, to form printed images. The inkjet printings have been rapidly spread because of their various advantages such as easiness of full colorization, low costs, capability of using ordinary paper as the recording medium, non-contact with printed images, etc. Among the printing methods, in view of enhancing the lightfastness and the water resistance of printed images, an inkjet printing method utilizing an ink containing a pigment as the colorant has now come to dominate. For example, WO 00/39226 discloses a water-based ink containing a pigment-containing vinyl polymer.

JP 11-269418A discloses the use of a block copolymer for water-based inkjet inks, which block copolymer is produced by the reaction of a macromer prepared from a monomer in the presence of a specific chain transfer agent and another monomer.

However, water-based inks having a better jetting stability and forming printed images with a high optical density, particularly on ordinary papers have been demanded. Such a demand progressively increases particularly in the thermal inkjet printings.

DISCLOSURE OF THE INVENTION

The present invention provides a water dispersion for inkjet printing which contains polymer particles containing a colorant, wherein a polymer constituting the polymer particles is produced by the copolymerization of a monomer mixture in the presence of α-methylstyrene dimer, and also provides a water-based ink for inkjet printing containing such a water dispersion.

The present invention also provides a water dispersion for inkjet printing which contains polymer particles containing a colorant, wherein a polymer constituting the polymer particles is produced by the copolymerization of a monomer mixture in the presence of an aromatic ring-containing polymerization initiator and α-methylstyrene dimer, and also provides a water-based ink for inkjet printing containing such a water dispersion.

The present invention still further provides a process for producing a water dispersion for inkjet printing which includes:

step 1 of polymerizing a monomer mixture in the presence of α-methylstyrene dimer, to synthesize a polymer;

step 2 of mixing the polymer obtained in the step 1, a colorant, an organic solvent and water and then subjecting a resulting mixture to a dispersing treatment, to obtain a dispersion of polymer particles containing the colorant; and step 3 of removing the organic solvent from the dispersion obtained in the step 2.

BEST MODE FOR CARRYING OUT THE INVENTION

The present invention provides a water dispersion for inkjet printing which is excellent in jetting properties and simultaneously exhibits a high optical density and a good highlighter-fastness, and provides a water-based ink for inkjet printing containing the water dispersion.

The water dispersion for inkjet printing is a water dispersion of polymer particles containing a colorant. The water dispersion and its components will be described below in order.

(I) Polymer

The polymer for constituting the polymer particles is preferably a water-insoluble polymer to cause the colorant to be included therein. The water-insoluble polymer referred to herein means polymers having a solubility of 10 g or less, preferably 5 g or less and more preferably one gram or less when dissolved into 100 g of water at 25° C. after dried at 105° C. for 2 h. When the water-insoluble polymer has a salt-forming group, the solubility is measured on a polymer after neutralizing 100% of the salt-forming groups with acetic acid or sodium hydroxide which is selected according to the types of the salt-forming groups.

Examples of the water-insoluble polymer include water-insoluble vinyl polymers, water-insoluble ester polymers and water-insoluble urethane polymers, with the water-insoluble vinyl polymers being preferred. To attain a sufficient optical density and durability of printed images even if printed on ordinary papers, water-insoluble graft polymers are preferable.

The polymer used in the present invention is a polymer, in particular a water-insoluble polymer, obtained by the copolymerization of a monomer mixture. The monomer mixture contains (A) a monomer having a salt-forming group (also called "component A"), and (B) a macromer (also called "component B") and/or (C) a hydrophobic monomer (also called "component C"). Such a monomer mixture may be simply referred to as "monomer mixture."

Preferred are polymers, particularly water-insoluble polymers, obtained by copolymerizing a monomer mixture containing (A) the monomer having a salt-forming group, (B) the macromer and (C) the hydrophobic monomer.

The component A is used to enhance the dispersion stability of resulting dispersions and may be cationic or anionic. Monomers described in JP 9-286939A, page 5, line 24 of column 7 to line 29 of column 8 are usable. Examples of the salt-forming groups include carboxyl group, sulfonic acid group, phosphoric acid group, amino group and ammonium group.

The cationic monomer is at least one monomer selected from the group consisting of tertiary amine-containing unsaturated monomers and ammonium salt-containing unsaturated monomers.

Examples of the tertiary amine-containing unsaturated monomers include N,N-dimethylaminoethyl(meth)acrylate, N,N-dimethylaminopropyl (meth)acrylate, N,N-diethylaminoethyl(meth)acrylate, N,N-dimethylaminopropyl(meth) acrylamide, 2-vinylpyridine, 4-vinylpyridine, 2-methyl-6-vinylpyridine and 5-ethyl-2-vinyl pyridine.

Examples of the ammonium salt-containing unsaturated monomers include quaternized products of N,N-dimethylaminoethyl(meth)acrylate, N,N-diethylaminoethyl(meth) acrylate and N,N-dimethylaminopropyl (meth)acrylate.

Among the above cationic monomers, N,N-dimethylaminoethyl (meth)acrylate and N,N-dimethylaminopropyl (meth)acrylamide are preferable.

Examples of the anionic monomers include unsaturated carboxylic acid monomers, unsaturated sulfonic acid monomers and unsaturated phosphoric acid monomers.

Examples of the unsaturated carboxylic acid monomers include acrylic acid, methacrylic acid, crotonic acid, itaconic acid, maleic acid, fumaric acid, citraconic acid and 2-methacryloyloxymethylsuccinic acid. Examples of the unsaturated sulfonic acid monomers include styrenesulfonic acid, 2-acrylamido-2-methylpropanesulfonic acid, 3-sulfopropyl (meth)acrylate and bis(3-sulfopropyl)itaconate. Examples of the unsaturated phosphoric acid monomers include vinylphosphonic acid, vinyl phosphate, bis(methacryloxyethyl)phosphate, diphenyl-2-acryloyloxyethyl phosphate, diphenyl-2-methacryloyloxyethyl phosphate and dibutyl-2-acryloyloxyethyl phosphate. To attain good dispersion stability and jetting properties, among these anionic monomers, preferred are unsaturated carboxylic acid monomers, and more preferred are acrylic acid and methacrylic acid.

The components A may be used singly or in combination of two or more.

The component B is used to enhance the dispersion stability of polymer particles containing a colorant and the optical density, and may include macromers having a number-average molecular weight of from 500 to 100,000 and preferably from 1,000 to 10,000 and a polymerizable unsaturated group. To enhance the affinity with the colorant, it is preferred for the macromers to have no hydrophilic group such as hydroxyl group. Among the macromers, styrene-based macromers and aromatic ring-containing, (meth)acrylate-based macromers each having a polymerizable functional group at one end are preferable because of their high affinity with the colorant.

The number-average molecular weight of the components B can be measured, as will be described later, by a gel chromatography using a standard polystyrene.

Examples of the styrene-based macromers include styrene homopolymer and copolymers of styrene and other monomers, each having a polymerizable functional group at one end. Of the copolymers, preferred are those mono-terminated by a functional group such as acryloyloxy group and methacryloyloxy group. To enhance the affinity with the colorant, the content of the styrene units in the macromer is preferably 50% by weight or more and more preferably 70% by weight or more. Examples of the monomers to be copolymerized with styrene include acrylonitrile.

Examples of the (meth)acrylate-based macromers having an aromatic ring include homopolymers of an aromatic ring-containing (meth)acrylate and copolymers of an aromatic ring-containing (meth)acrylate with other monomers, each being mono-terminated by a polymerizable functional group, preferably by acryloyloxy group or methacryloyloxy group.

Examples of the aromatic ring-containing (meth)acrylates include benzyl(meth)acrylate, phenoxyethyl(meth)acrylate, 2-hydroxy-3-phenoxypropoyl(meth)acrylate and 2-methacryloyloxyethyl 2-hydroxypropyl phthalate, with benzyl (meth)acrylate being preferred. To enhance the affinity with the colorant, the content of the aromatic ring-containing (meth)acrylate units in the macromer is preferably 50% by weight or more and more preferably 70% or more. Examples of the monomers to be copolymerized with the aromatic ring-containing (meth)acrylate include acrylonitrile.

The polymers used in the present invention may have side chains constituted by other units. Examples of the side chains include organopolysiloxane side chains. This side chain can be introduced, for example, by the copolymerization of a silicone-based macromer having a polymerizable functional group at one end, which is preferably represented by the following formula 1:

$$CH_2=C(CH_3)-COOC_3H_6-[Si(CH_3)_2-O]_t-Si(CH_3)_3 \quad (1)$$

wherein the subscript t is a number of from 8 to 40.

The styrene-based macromers as the component B are commercially available, for example, under the tradenames of AS-6, AS-6S, AN-6, AN-6S, HS-6 and HS-6S of Toa Gosei Co., Ltd.

The components B may be used singly or in combination of two or more.

The component C is used to improve the optical density and the highlighter-fastness (degree of blur of printed images when traced with an aqueous fluorescent pen), and may include alkyl(meth)acrylates, alicyclic (meth)acrylates, (meth)acrylamides and aromatic ring-containing monomers.

Examples of the alkyl(meth)acrylates include (meth)acrylic acid esters having an alkyl group of from 1 to 22 carbon atoms such as methyl (meth)acrylate, ethyl(meth)acrylate, (iso)propyl(meth)acrylate, (iso or tert-)butyl(meth)acrylate, (iso)amyl(meth)acrylate, (iso)hexyl(meth)acrylate, 2-ethylhexyl(meth)acrylate, (iso)octyl(meth)acrylate, (iso)decyl(meth)acrylate, (iso)dodecyl(meth)acrylate and (iso)stearyl(meth)acrylate.

Examples of the alicyclic (meth)acrylates include monocyclic (meth)acrylates, dicyclic (meth)acrylates and polycyclic (meth)acrylates having three or more ring structures. The ring structures may have a substituent.

Examples of the monocyclic (meth)acrylates include cycloalkyl (meth)acrylates having a cycloalkyl group of from 3 to 10 carbon atoms, such as cyclopropyl(meth)acrylate, cyclobutyl(meth)acrylate, cyclopentyl (meth)acrylate, cyclohexyl(meth)acrylate, cycloheptyl(meth)acrylate, cyclooctyl (meth)acrylate, cyclononyl(meth)acrylate and cyclodecyl (meth)acrylate. Examples of the dicyclic (meth)acrylates include isobornyl (meth)acrylate and norbornyl(meth)acrylate. Examples of the tricyclic (meth)acrylates include adamantyl(meth)acrylate and dicyclopentanyl (meth)acrylate. These compounds may be used singly or in combination of two or more.

Preferable examples of the (meth)acrylamides include N-methyl(meth)acrylamide, N-ethyl(meth)acrylamide, N,N-dimethyl(meth)acrylamide, N,N-diethyl(meth)acrylamide, N,N-dimethylaminoethyl(meth)acrylamide, N,N-diethylaminoethyl(meth)acrylamide, N-methylol(meth)acrylamide methyl ether and N-methylol(meth)acrylamide butyl ether.

Examples of the aromatic ring-containing monomers include vinyl monomers having an aromatic hydrocarbon group of from 6 to 22 carbon atoms such as styrene, 2-methylstyrene, vinyltoluene, ethylvinylbenzene, 4-vinylbiphenyl, 1,1-diphenylethylene, benzyl(meth)acrylate, phenoxyethyl (meth)acrylate, vinylnaphthalene and chlorostyrene.

The term "(iso or tert-)alkyl" means isoalkyl, tert-alkyl or n-alkyl, and the term "(iso)alkyl" means isoalkyl or n-alkyl. The term "(meth)acrylate" means acrylate or methacrylate.

The components C may be used singly or in combination of two or more.

To improve the optical density and the highlighter-fastness, the component C is preferably a styrene-based monomer (component C-1), and more preferably styrene or 2-methylstyrene. The content of the component C-1 in the component C is preferably from 10 to 100% by weight and more preferably from 20 to 80% by weight, because the optical density and the highlighter-fastness can be more improved.

To attain a sufficient optical density, also preferred as the component C is an aryl ester of (meth)acrylic acid (component C-2). Examples thereof include arylalkyl esters of (meth)acrylic acid having an arylalkyl group of from 7 to 22 carbon atoms, preferably from 7 to 18 carbon atoms and more preferably from 7 to 12 carbon atoms and aryl esters of (meth)acrylic acid having an aryl group of from 6 to 22 carbon atoms, preferably of from 6 to 18 carbon atoms and more preferably of from 6 to 12 carbon atoms. Specific examples thereof include benzyl(meth)acrylate and phenoxyethyl (meth)acrylate. The content of the component C-2 in the component C is preferably 10 to 100% by weight and more preferably 20 to 80% by weight.

To improve the optical density and the highlighter-fastness, also preferred as the component C is at least one compound selected from the group consisting of the alkyl(meth)acrylates, the alicyclic (meth)acrylates and the aromatic ring-containing monomers, and more preferred is at least one compound selected from the group consisting of the alicyclic (meth)acrylates and the aromatic ring-containing monomers. Among the above compounds, preferred are benzyl(meth)acrylate, isobornyl(meth)acrylate, styrene and α-methylstyrene are preferable, and more preferred are benzyl(meth)acrylate, isobornyl(meth)acrylate and styrene.

The component C may be used singly or in combination of two or more. It is also preferable to combinedly use the component C-1 and component C-2.

It is preferred for the monomer mixture of the components A, B and C to further contains (d) a hydroxyl-containing monomer (component D).

The component D is used to create excellent effects of enhancing the dispersion stability and increasing the highlighter-fastness in a short time just after printing. Examples thereof include 2-hydroxyethyl(meth)acrylate, 3-hydroxypropyl(meth)acrylate, polyethylene glycol (meth)acrylate (n=2 to 30; n being an average molar addition number of oxyalkylene units and the same applying below), polypropylene glycol (meth)acrylate (n=2 to 30) and poly(ethylene glycol (n=1 to 15)-propylene glycol (n=1 to 15)) (meth)acrylate, with 2-hydroxyethyl(meth)acrylate, polyethylene glycol monomethacrylate and polypropylene glycol methacrylate being preferred.

The monomer mixture may further contain (e) a monomer represented by the following formula 2 (component E):

$$CH_2=C(R^1)COO(R^2O)_pR^3 \qquad (2)$$

wherein $R^1$ represents a hydrogen atom or an alkyl group having from 1 to 5 carbon atoms, $R^2$ represents a divalent hydrocarbon group having from 1 to 30 carbon atoms which may have a heteroatom, $R^3$ represents a monovalent hydrocarbon group having from 1 to 30 carbon atoms which may have a heteroatom, the subscript p represents an average molar addition number of from 1 to 60, preferably from 1 to 30.

The component E creates excellent effects of improving the jetting stability of water-based inks and preventing the deformation of printed images even in a continuous printing operation.

Examples of the optional heteroatoms for $R^2$ or $R^3$ of the formula 2 include nitrogen atom, oxygen atom and sulfur atom.

Examples of $R^2$ and $R^3$ include aromatic groups having from 6 to 30 carbon atoms, heterocyclic groups having from 3 to 30 carbon atoms and alkylene groups having from 1 to 30 carbon atoms, each optionally having a substituent. $R^2$ and $R^3$ may be a combination of two or more of these groups.

Examples of the substituents include aromatic groups, heterocyclic groups, alkyl groups, halogen atoms and amino groups.

Preferred examples of $R^2$ include phenylene group which may have a substituent having from 1 to 24 carbon atoms, aliphatic alkylene groups having from 1 to 30 carbon atoms and preferably from 1 to 20 carbon atoms, aromatic ring-containing alkylene groups having from 7 to 30 carbon atoms and hetero ring-containing alkylene groups having from 4 to 30 carbon atoms. Preferable examples of $R^2O$ include oxyethylene group, oxy(iso)propylene group, oxytetramethylene group, oxyheptamethylene group, oxyhexamethylene group, oxyalkylene groups having from 2 to 7 carbon atoms composed of at least one of preceding oxyalkylene groups, and oxyphenylene group.

Preferred examples of $R^3$ include phenyl group, aliphatic alkyl groups having from 1 to 30 carbon atoms and preferably from 1 to 20 carbon atoms, aromatic ring-containing alkyl groups having from 7 to 30 carbon atoms and hetero ring-containing alkyl groups having from 4 to 30 carbon atoms, with alkyl groups having from 1 to 12 carbon atoms such as methyl group, ethyl group, (iso)propyl group, (iso)butyl group, (iso)pentyl group, (iso)hexyl group, (iso)octyl group and (iso)dodecyl group, and phenyl group being more preferred.

Examples of the components E include methoxypolyethylene glycol (meth)acrylate (p in the formula 2 is from 1 to 30), methoxypolytetramethylene glycol (meth)acrylate (p=1 to 30), ethoxypolyethylene glycol (meth)acrylate (p=1 to 30), (iso)propoxypolyethylene glycol (meth)acrylate (p=1 to 30), butoxypolyethylene glycol (meth)acrylate (p=1 to 30), octoxypolyethylene glycol (meth)acrylate (p=1 to 30), phenoxypolyethylene glycol (meth)acrylate (p=1 to 30), methoxypolypropylene glycol (meth)acrylate (p=1 to 30), methoxy(ethylene glycol/propylene glycol copolymer) (meth)acrylate (p=1 to 30; p=1 to 29 for the ethylene glycol portion) and phenoxy(ethylene glycol/propylene glycol copolymer) (meth)acrylate (p=1 to 30; p=1 to 29 for the ethylene glycol portion). Among these compounds, preferred are methoxypolyethylene glycol (meth)acrylate (p=1 to 30), octoxypolyethylene glycol (meth)acrylate (p=1 to 30), phenoxypolyethylene glycol (meth)acrylate (p=1 to 30) and phenoxy (ethylene glycol/propylene glycol copolymer) (meth)acrylate (p=1 to 30; p=1 to 29 for the ethylene glycol portion).

Specific examples of the components D and E which are commercially available include (meth)acrylate monomers (NK Ester) M-40G, 90G and 230G of Shin Nakamura Kagaku Kogyo Co., Ltd. and Blenmer series PE-90, 200 and 350, PME-100, 200, 400 and 1000, PP-1000, PP-500, PP-800, AP-150, AP-400, AP-550, AP-800, 50PEP-300, and 50POEP-800B of NOF Corporation.

Each of the components D and E may be used singly or in combination of two or more.

A preferred content for each of the components A to E in the monomer mixture is as follows.

To attain a sufficient dispersion stability, the content of the component A is preferably from 1 to 50% by weight, more preferably from 2 to 40% by weight, still more preferably from 3 to 30% by weight, and particularly preferably from 5 to 20% by weight.

To attain sufficient dispersion stability of the fine polymer particles containing a colorant and optical density, the content of the component B is preferably from 1 to 60% by weight, more preferably from 5 to 50% by weight and still more preferably from 10 to 45% by weight.

To attain sufficient highlighter-fastness and optical density, the content of the component C is preferably from 5 to 98% by weight, more preferably from 10 to 60% by weight and still more preferably from 15 to 50% by weight.

To attain sufficient long-term storage stability and jetting properties of resulting water-based inks, the weight ratio (A/(B+C)) of the content of the component A and the total content of the components B and C is preferably from 0.01 to 1, more preferably from 0.02 to 0.67, still more preferably from 0.05 to 0.5 and most preferably from 0.1 to 0.4.

To attain sufficient jetting properties, optical density and highlighter-fastness, the content of the component D is preferably from 0 to 40% by weight and more preferably from 1 to 20% by weight.

To attain sufficient jetting properties and dispersion stability, the content of the component E is preferably from 1 to 50% by weight and more preferably from 2 to 40% by weight.

To attain sufficient stability in water and water resistance, the total content of the components A and D is preferably from 6 to 60% by weight and more preferably from 10 to 50% by weight.

To attain sufficient dispersion stability in water and jetting properties, the total content of the components A and E is preferably from 1 to 60% by weight and more preferably from 3 to 50% by weight.

To attain sufficient dispersion stability in water and jetting stability, the total content of the components A, D and E is preferably from 6 to 60% by weight and more preferably from 7 to 50% by weight.

The polymer for constituting the polymer particles is produced by copolymerizing the above monomer mixture by a known polymerization method such as bulk polymerization, solution polymerization, suspension polymerization and emulsion polymerization, with the solution polymerization being preferred because of its ease of temperature control.

To achieve the object of the present invention, particularly, to improve the optical density and highlighter-fastness, it is necessary to perform the polymerization of the monomer mixture in the presence of a chain transfer agent, e.g. 2,4-diphenyl-4-methyl-1-pentene (also called "α-methylstyrene dimer" which may be simply referred to as "MSD"). A commonly used chain transfer agent such as mercaptans (for example, octyl mercaptan and 2-mercaptoethanol) and thiuram disulfides may be used in combination. MSD also works as the chain transfer agent of addition/cleavage type.

The polymerization of the monomer mixture in an organic solvent can be performed under heating while stirring a mixture of MSD, a polymerization initiator, a monomer mixture and an organic solvent. To avoid extreme temperature rise of the reaction system due to reaction heat, the polymerization is preferably performed in the following methods 1 to 3.

(1) Into MSD and an organic solvent charged into a reactor, a monomer mixture and a polymerization initiator are added as a mixture or separately over a prescribed time while stirring preferably at 120 to 200° C.

(2) In the method 1, a portion or entire amount of MSD is added in combination with the monomer mixture as a mixture or separately.

(3) In the method 1, a portion or entire amount of the monomers is charged into the reactor.

To attain sufficient jetting properties and optical density, the amount of MSD to be used is preferably from 1 to 30 parts by weight, more preferably from 1 to 20 parts by weight and most preferably from 1 to 10 parts by weight per 100 parts by weight of the monomer mixture.

The polymerization of the monomer mixture may be performed in the presence of a polymerization initiator in addition to MSD. Examples of the polymerization initiators include peroxide polymerization initiators such as cyclohexanone peroxide, 3,3,5-trimethylcyclohexanone peroxide, methylcyclohexanone peroxide, 1,1-bis(tert-butylperoxy)-3,3,5-trimethylcyclohexane, 1,1-bis(tert-butylperoxy)cyclohexane, n-butyl-4,4-bis(tert-butylperoxy)valerate, cumene hydroperoxide, cymene hydroperoxide, 2,5-dimethylhexane 2,5-dihydroperoxide, 1,3-bis(tert-butylperoxy-m-isopropyl)benzene, 2,5-dimethyl-2,5-di(tert-butylperoxy)hexane, diisopropylbenzene peroxide, tert-butyl cumyl peroxide, dicumyl peroxide, decanoyl peroxide, lauroyl peroxide, benzoyl peroxide, 2,4-dichlorobenzoyl peroxide, bis(tert-butylcyclohexyl)peroxydicarbonate, tert-butyl peroxybenzoate and 2,5-dimethyl-2,5-di(benzolyperoxy)hexane; and azo polymerization initiators such as 2,2'-azobis(isobutyronitrile), 1,1-azobis(cyclohexane-1-carbonitrile), azocumene, 2,2'-azobis(2-methylbutyronitrile), 2,2'-azobis-2,4-dimethylvaleronitrile, 4,4'-azobis(4-cyanovaleric acid), 2-(t-butylazo)-2-cyanopropane, 2,2'-azobis(2,4,4-trimethylpentane), 2,2'-azobis(2-methylpropane) and dimethyl 2,2'-azobis(2-methylpropionate).

To attain sufficient jetting properties, optical density and highlighter-fastness, polymerization initiators having an aromatic ring are preferably used in the present invention. Such polymerization initiators introduce an aromatic ring into one of the ends of the polymers mentioned above. The term "end" means the end of the main chain of the polymer and not the end of the macromer (component B).

Preferred as the polymerization initiator having an aromatic ring is at least one peroxide selected from the group consisting of benzoyl peroxide, cumene hydroperoxide, cymene hydroperoxide and dicumyl peroxide. In the present invention, benzoyl peroxide is particularly preferable.

To avoid the starving and scorching, the amount of the polymerization initiator used is preferably 0.1 part, more preferably 0.5 part, still more preferably 1 part and most preferably 1.3 parts for the lower limit, and preferably 20 parts, more preferably 10 parts, still more preferably 8 parts, yet still more preferably 7 parts and most preferably 5 parts for the upper limit, with the parts being given by weight per 100 parts by weight of the monomer mixture. The amount is also preferably from 0.1 to 10 parts by weight, more preferably from 0.5 to 8 parts by weight and most preferably from 1.3 to 5 parts by weight per 100 parts by weight of the monomer mixture.

An organic solvent capable of dissolving or dispersing the monomer mixture and the polymer being produced can be used as the solvent for the polymerization.

Examples of the organic solvents include hydrocarbon solvents such as heptane, toluene, xylene, octane and mineral spirits; ester solvents such as ethyl acetate, n-butyl acetate, isobutyl acetate, ethylene glycol monomethyl ether acetate and diethylene glycol monobutyl ether acetate; ketone solvents such as methyl ethyl ketone, methyl isobutyl ketone, diisobutyl ketone and cyclohexanone; alcohol solvents such as methanol, ethanol, isopropanol, n-butanol, sec-butanol and isobutanol; ether solvents such as n-butyl ether, dioxane, ethylene glycol monomethyl ether and ethylene glycol monoethyl ether; and aromatic petroleum solvents such as Swasol 310, Swasol 1000 and Swasol 1500 of Cosmo Oil Co., Ltd.

These organic solvents may be used singly or in combination of two or more. The organic solvent is used in the polymerization preferably in an amount of 200% by weight or less of the total amount of the monomer mixture.

To cause MSD to be cleaved, attain sufficient jetting properties and optical density, and avoid the starving and scorching, the polymerization temperature is from 100 to 200° C., from 105 to 200° C., from 110 to 200° C., from 120 to 200° C., from 130 to 200° C., from 140 to 180° C. and from 150 to 180° C., wherein the ranges are given in order of preferredness, with the first range being preferred and the last range being most preferred.

To avoid the starving and scorching, the initial concentration (concentration in the total charge) of MSD charged into the reactor is preferably from 10 to 50% by weight, more preferably from 10 to 40% by weight and most preferably from 15 to 28% by weight.

To avoid the starving and scorching, the feeding rate of the monomer mixture is preferably from 0.5 to 20 g/h, more preferably from 1.0 to 15 g/h and most preferably from 1.5 to 4.5 g/h per one gram of MSD (the amount of MSD actually present in the reactor).

Other conditions of the polymerization vary depending on the types of the polymerization initiator, the monomers and the solvent used. The polymerization time is preferably from 1 to 20 h. The polymerization is preferably performed in an atmosphere of inert gas such as nitrogen gas and argon gas. The polymerization is performed either in single stage or multiple stages. In a multi-stage polymerization, the polymerization temperature may be changed from stage to stage, for example, first 100 to 140° C., next 140 to 180° C., and then 180 to 200° C.

After completing the polymerization, the produced polymer can be separated from the reaction solution by a known method such as reprecipitation and solvent removal by distillation. The obtained polymer can be purified by removing the unreacted monomers by repeated recrystallization, membrane separation, chromatography or extraction.

It is expected that the polymer thus obtained has an aromatic group derived from MSD, which serves as an addition/cleavage chain transfer agent, at least at one end of its main chain. If the polymerization initiator used has an aromatic ring, an aromatic group can be introduced into the other end of the main chain to likely provide a polymer having aromatic groups at both ends of its main chain.

To make the dispersion stability of colorant, water resistance, optical density and jetting properties sufficient, the weight-average molecular weight of the polymer is preferably from 3,000 to 200,000 and more preferably from 4,000 to 100,000. Since uniform polymers exhibit improved jetting properties and optical density, the molecular weight distribution (weight-average molecular weight/number-average molecular weight) is preferably from 1 to 5, more preferably from 1 to 4 and most preferably from 1 to 3.5.

The weight-average molecular weight and the number-average molecular weight can be measured by the method used in the examples described below.

If the polymer has a salt-forming group derived from the monomer having a salt-forming group (component A), it is used for the production of the water-dispersion after neutralization. The neutralizing agent is selected from acids and bases according to the types of the salt-forming groups. Examples of the neutralizing agents include acids such as hydrochloric acid, acetic acid, propionic acid, phosphoric acid, sulfuric acid, lactic acid, succinic acid, glycolic acid, gluconic acid and glyceric acid; and bases such as lithium hydroxide, sodium hydroxide, potassium hydroxide, ammonia, methylamine, dimethylamine, trimethylamine, ethylamine, diethylamine, triethanolamine and tributylamine.

The degree of neutralization of salt-forming groups is preferably from 10 to 200%, more preferably from 20 to 150% and most preferably from 50 to 150%. The degree of neutralization of anionic salt-forming groups is calculated from the following formula.

{[weight of neutralizing agent (g)/equivalent of neutralizing agent]/[acid value of polymer (KOH mg/g)×weight of polymer (g)/(56×1000)]}×100

The degree of neutralization of cationic salt-forming groups is calculated from the following formula.

{[weight of neutralizing agent (g)/equivalent of neutralizing agent]/[amine value of polymer (HCl mg/g)×weight of polymer (g)/(36.5×1000)]}×100

The acid value and the amine value can be calculated from the amounts of constituting units of the polymer or can be obtained by the titration of a polymer solution in a suitable solvent such as methyl ethyl ketone.

(II) Colorant

To attain a sufficient water resistance, pigments and hydrophobic dyes are preferably used as the colorant for use in the water dispersion of the present invention, with the pigments being more preferred to meet the recent strong demand for a high lightfastness.

The pigments and hydrophobic dyes are preferably made into stable fine particles in the water-based inks by using a surfactant or a water-insoluble polymer. To achieve sufficient bleeding resistance and water resistance, the pigments and hydrophobic dyes are preferably included into the polymer particles.

The pigments may be inorganic or organic. An extending pigment may be used, if needed, in combination with the pigment.

Examples of the inorganic pigments include carbon black, metal oxides, metal sulfides and metal chlorides, with carbon black being preferred particularly for black water-based inks. Carbon black may include furnace black, thermal lamp black, acetylene black and channel black.

Examples of the organic pigments include azo pigments, diazo pigments, phthalocyanine pigments, quinacridone pigments, isoindolinone pigments, dioxazine pigments, perylene pigments, perynone pigments, thioindigo pigments, anthraquinone pigments and quinophthalone pigments.

Specific examples of the preferred organic pigment include C.I. Pigment Yellow 13, 17, 74, 83, 97, 109, 110, 120, 128, 139, 151, 154, 155, 174, and 180; C.I. Pigment Red 48, 57:1, 122, 146, 176, 184, 185, 188 and 202; C.I. Pigment Violet 19 and 23; C.I. Pigment Blue 15, 15:1, 15:2, 15:3, 15:4, 16 and 60; and C.I. Pigment Green 7 and 36.

Examples of the extending pigments include silica, calcium carbonate and talc.

Any hydrophobic dyes can be used as long as the dyes can be included into the polymer particles. To efficiently incorporate into the polymer, preferred are hydrophobic dyes which dissolve into the organic solvent that is used for the production of the polymer in a proportion of 2 g/L or more and more preferably from 20 to 500 g/L (25° C.).

Examples of the hydrophobic dyes include oil-soluble dyes and disperse dyes, with the oil-soluble dyes being preferred.

Examples of the oil-soluble dyes include C.I. Solvent Black 3, 7, 27, 29, 34 and 45; C.I. Solvent Yellow 14, 16, 29, 56, 82 and 83:1; C.I. Solvent Red 1, 3, 8, 18, 24, 27, 43, 49, 51, 72 and 73; C.I. Solvent Violet 3; C.I. Solvent Blue 2, 4, 11, 44, 64 and 70; C.I. Solvent Green 3 and 7; and C.I. Solvent Orange 2.

The oil-soluble dyes are commercially available, for example, under the names of Nubian Black PC-0850, Oil Black HBB, Oil Black 860, Oil Yellow 129, Oil Yellow 105, Oil Pink 312, Oil Red 5B, Oil Scarlet 308, Vali Fast Blue 2606 and Oil Blue BOS (trade names of Orient Chemical Industries, Ltd.); and Neopen Yellow 075, Neopen Magenta SE1378, Neopen Blue 808, Neopen Blue 807, Neopen Blue FF4012 and Neopen Cyan FF4238 (trade names of BASF Aktiengesellschaft).

Examples of the disperse dyes include C.I. Disperse Yellow 5, 42, 54, 64, 79, 82, 83, 93, 99, 100, 119, 122, 124, 126, 160, 184:1, 186, 198, 199, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C.I. Disperse Green 6:1 and 9. Among these disperse dyes, preferred are C.I. Solvent Yellow 29 and 30 for yellow dyes; C.I. Solvent Blue 70 for cyan dyes; C.I. Solvent Red 18 and 49 for magenta dyes; C.I. Solvent Black 3 and 7; and nigrosin black dyes for black dyes.

The above colorants may be used singly or in combination of two or more.

The content of the colorant in the water dispersion and in the water-based ink of the present invention is preferably from 1 to 30% by weight, more preferably from 2 to 20% by weight and most preferably from 2 to 10% by weight, because the dispersion stability and optical density are enhanced.

To enhance the optical density, the weight ratio of colorant/polymer (solid basis) is preferably from 95/5 to 40/60 and more preferably from 85/15 to 50/50.

(III) Water Dispersion and Water-Based Ink

The water dispersion of the present invention may be produced by a processing in the including the following steps of:

(1) polymerizing a monomer mixture in the presence of α-methylstyrene dimer, to synthesize a polymer;

(2) mixing the polymer obtained in the step 1, a colorant, an organic solvent, water and an optional neutralizing agent, and then subjecting a resulting mixture to a dispersing treatment, to obtain a dispersion of polymer particles containing the colorant; and step 3 of removing the organic solvent from the dispersion obtained in the step 2.

The step 1 for synthesizing the polymer in the presence of α-methylstyrene dimer is described above in the part of "POLYMER."

In a preferred procedure of the step 2, the polymer is first dissolved into the organic solvent. Then, the colorant, water and optional ingredients such as a neutralizing agent and a surfactant are added to the organic solvent and formed into an oil-in-water dispersion by mixing. The contents in the mixture are preferably from 5 to 50% by weight and more preferably from 5 to 30% by weight for the colorant; preferably from 5 to 70% by weight and more preferably from 10 to 70% by weight for the organic solvent; preferably from 1 to 40% by weight and more preferably from 2 to 40% by weight for the polymer; and preferably from 10 to 85% by weight and more preferably from 10 to 70% by weight for water. When the polymer has a salt-forming group, a neutralizing agent is preferably used. The degree of neutralization is not critical, and may be selected so as to make the final water dispersion around neutral, for example, pH of from 4.5 to 10. Alternatively, the pH value may be adjusted in accordance with the desired degree of neutralization.

Preferred organic solvents for use in the step 2 may include alcohol solvents, ketone solvents and ether solvents, with those having a solubility to water of from 10 to 50% by weight at 20° C. being more preferred.

Examples of the alcohol solvents include ethanol, isopropanol, n-butanol, tert-butanol, isobutanol and diacetone alcohol. Examples of the ketone solvents include acetone, methyl ethyl ketone, diethyl ketone and methyl isobutyl ketone. Examples of the ether solvents include dibutyl ether, tetrahydrofuran and dioxane. Among these solvents, preferred are isopropanol, acetone and methyl ethyl ketone, with methyl ethyl ketone being more preferred.

The neutralizing agent is selected from acids or bases described above according to the types of the salt-forming groups in the water-insoluble vinyl polymer.

The manner for making the mixture into a dispersion in the step 2 is not particularly limited. The polymer particles are made finer so as to have a desired particle size preferably by a pre-dispersion operation and a subsequent main dispersion operation under shear stress, although such can be attained in some cases by the main dispersion operation alone.

Common mixing and stirring devices such as anchor blades are usable in the pre-dispersion operation.

The shear stress in the main dispersion operation is generated by a mixing machine such as roll mill, bead mill, kneader and extruder, or a high-pressure homogenizer of homo valve type or chamber type, with the high-pressure homogenizer being preferred because the pigment in the mixture is made finer.

In the step 3, the organic solvent is removed so as to convert the dispersion into an aqueous system, leaving the water dispersion of polymer particles containing the colorant. The removal of the organic solvent is conducted by a known method such as vacuum distillation. The organic solvent is substantially completely removed from the resultant water dispersion of polymer particles such that its content is preferably 0.1% by weight or smaller and more preferably 0.01% by weight or smaller.

In the water dispersion of polymer particles containing the colorant, the solid components of the polymer containing the colorant are dispersed in the medium mainly composed of water. The form of the polymer particles containing the colorant is not particularly limited as long as the particles are formed from the colorant and the polymer, and can be any of forms, for example, a form where the colorant is encapsulated in the polymer, a form where the colorant is uniformly dispersed within the polymer and a form where the colorant is exposed to the surface of the polymer particles.

The water dispersion of the polymer particles may be directly used as the water-based ink with or without the use of additives commonly employed in the preparation of water-based inks for inkjet printing, such as wetting agents, penetrating agents, dispersants, viscosity regulators, defoaming agents, fungicides and corrosion inhibitors.

To prevent the clogging of printer nozzles and obtain a sufficient dispersion stability, the average particle size of the polymer particles in the water dispersion or the water-based ink is preferably from 0.01 to 0.5 µm, more preferably from 0.03 to 0.3 µm and most preferably from 0.05 to 0.2 µm. The average particle size can be measured by using a laser particle analyzing system ELS-8000 (cumulant method) manufactured by Ohtsuka Denshi Co., Ltd. under the following conditions.

Measuring temperature: 25° C.
Angle between incident light and detector: 90°
Number of cumulation: 100
Refractive index of dispersing medium: 1.333 (refractive index of water)
Measuring concentration: about $5 \times 10^{-3}$% by weight To attain sufficient optical density and jetting properties, the content (solid basis) of the polymer particles containing the colorant in the water dispersion or in the water-based ink is controlled into preferably from 0.5 to 30% by weight and more preferably from 1 to 15% by weight.

The content of water in the water dispersion and in the water-based ink is preferably from 30 to 90% by weight and more preferably from 40 to 80% by weight.

The surface tension at 20° C. is preferably 30 mN/m or higher and lower than 73 mN/m and more preferably 35 mN/m or higher and lower than 70 mN/m for the water dispersion, and preferably from 25 to 50 mN/m and more preferably from 27 to 45 mN/m for the water-based ink.

The viscosity at 20° C. of the water dispersion having a concentration of 10% by weight is preferably from 1.5 to 6 mPa·s and more preferably from 1.5 to 5 mPa·s so that the viscosity of resulting water-based inks can be made appropriate. To maintain a good jetting properties, the viscosity of the water-based inks at 20° C. is preferably from 1.5 to 12 mPa·s and more preferably from 1.5 to 10 mPa·s.

The water-based ink for inkjet printing containing the water dispersion of the present invention exhibits, in addition to the excellent jetting properties, a sufficient optical density even in the inkjet printing on an ordinary paper, and also exhibits a high optical density and a good highlighter-fastness simultaneously.

The present invention will be described in more detail with reference to the following examples. However, the scope of the present invention is not limited to the following examples. In the following examples and comparative examples, "part(s)" and "%" mean "part(s) by weight" and "% by weight", respectively, unless otherwise mentioned.

PREPARATION EXAMPLE 1

Preparation of Styrene Macromer A

Into 10 parts of toluene, 50 parts of styrene and 0.4 parts of mercaptopropionic acid charged in a flask, a mixture of 80 parts of toluene, 200 parts of styrene, 12.5 parts of mercaptopropionic acid and 4 parts of V-65 (2,2'-azobis-2,4-dimethylvaleronitrile, an azo radical polymerization initiator manufactured by Wako Pure Chemical Industries, Ltd.) was added dropwise over 4 h at 90° C. under stirring while blowing nitrogen gas into the contents.

Then, a mixture of 80 parts of toluene, 4.7 parts of mercaptopropionic acid and 4 parts of V-65 was added dropwise over 2 h at the same temperature.

A mixture of 100 parts of toluene, 4 parts of mercaptopropionic acid and 1.5 parts of V-65 was further added dropwise over 2 h at the same temperature.

A mixture of 34 parts of glycidyl methacrylate, 5 parts of toluene, 5 parts of tetrabutylammonium bromide and 0.5 part of methoquinone was added under stirring while introducing air into the flask from an air inlet, and the reaction was allowed to proceed for 8 h at 90° C., to obtain a solution of styrene macromer A.

When the styrene macromer A will be used at a reaction temperature of 130° C. or higher, it is preferred to replace toluene with an organic solvent having a boiling point of 130° C. or higher (such as ethylene glycol monobutyl ether) by removing toluene by a known method such as vacuum distillation.

The molecular weight of the styrene macromer A was measured by a gel permeation chromatography on its 50% solution using tetrahydrofuran containing 50 mmol/L of acetic acid as the eluent and standard polystyrene. The weight-average molecular weight was 2,839, and the number-average molecular weight was 1,727 (molecular weight distribution: 1.64). In the following examples and comparative examples, a styrene macromer A of a 50% purity was used unless otherwise mentioned.

EXAMPLE 1

Reaction 1

Into 50 parts of α-methylstyrene dimer and 50 parts of ethylene glycol monobutyl ether charged in a flask, a mixture of 42.6 parts of methacrylic acid, 12.5 parts of NK Ester EH-4E (octoxypolyethylene glycol monomethacrylate manufactured by Shin Nakamura Kagaku Kogyo Co., Ltd.; average molar addition number of ethylene oxide=4), 100 parts of benzyl methacrylate, 12.6 parts of ethylene glycol monobutyl ether and 4.6 parts of "Perhexyl D" (di-t-hexyl peroxide, a peroxide radical polymerization initiator manufactured by NOF Corporation) was added dropwise over 3 h at 160° C. under stirring while blowing nitrogen gas into the contents. After aging the mixture at the same temperature for 30 min, 147 parts of ethylene glycol monobutyl ether was added and the mixture was cooled, to obtain a polymer solution having a solid content of 50%.

Reaction 2

Into a flask, was charged 75 parts of the polymer solution obtained in Reaction 1, into which a mixture of 29.9 parts of methacrylic acid, 10.3 parts of NK Ester EH-4E, 82.1 parts of benzyl methacrylate, 187.1 parts of styrene macromer A, 50.4 parts of ethylene glycol monobutyl ether and 2.7 parts of V-59 (2,2'-azobis-2-methylbutyronitrile, an azo radical polymerization initiator manufactured by Wako Pure Chemical Industries, Ltd.) was added dropwise over 3 h at 120° C. under stirring while blowing nitrogen gas into the contents. After aging the mixture at the same temperature for 30 min, 87.5 parts of ethylene glycol monobutyl ether was added, and the mixture was cooled, to obtain a polymer solution having a concentration of 52.9% (effective ingredients). The molecular weight of the obtained polymer was measured by a gel permeation chromatography using tetrahydrofuran containing 50 mmol/L of acetic acid as the eluent and standard polystyrene. The weight-average molecular weight was 9,150, and the number-average molecular weight was 3,316 (molecular weight distribution: 2.76).

To 37.8 parts of the polymer solution obtained in Reaction 2, 75.2 parts of methyl ethyl ketone, 5.3 parts of a 5 N aqueous solution of sodium hydroxide, 1.1 parts of a 25% aqueous solution of ammonia, 260.5 parts of ion-exchanged water and 80 parts of carbon black (Monarch 880 manufactured by Cabot Corporation) were added. The mixture was mixed at 15° C. for one hour using Disper blades and then added with 214.6 parts of ion-exchanged water. The mixture was subjected to a dispersing treatment by passing through a microfluidizer (manufactured by Microfluidics Co., Ltd.) 15 times under 180 MPa.

The obtained dispersion was concentrated by removing the organic solvent and water at 60° C. under reduced pressure, and coarse particles were removed by the filtration through a 25-mL syringe (manufactured by Terumo Corporation) equipped with a 5-μm pore size microfilter (acetylcellulose membrane filter manufactured by Fuji Photo Film Co., Ltd.), to obtain a water dispersion, 20% solid content, of pigment-containing vinyl polymer particles.

A mixture was prepared by mixing 20 parts of the obtained water dispersion, 8 parts of glycerol, 5 parts of polyethylene glycol (molecular weight: 800), 0.2 parts of Acetylenol EH (an acetylene glycol surfactant manufactured by Kawaken Fine Chemicals Co., Ltd.) and 44.3 parts of ion-exchanged water. To remove coarse particles, the mixture was then filtered through a 25-mL syringe equipped with a 1.2-μm pore size microfilter (acetylcellulose membrane filter manufactured by Fuji Photo Film Co., Ltd.), to obtain a water-based ink.

EXAMPLES 2-6

Each water dispersion, 20% solid content, of pigment-containing vinyl polymer particles and each water-based ink were prepared in the same manner as in Example 1 except for changing the composition of the vinyl polymer and the ingredients of the water dispersion of pigment-containing vinyl polymer particles as shown in Table 1. The weight-average molecular weight and the number-average molecular weight of the vinyl polymer were measured in the same manner as in Example 1. The results are shown in Tables 2-1 and 2-2.

Blenmer 50POEP-800 used in Example 2 was octoxypolyethylene glycol polypropylene glycol monomethacrylate (average molar addition number of ethylene oxide: 8; average molar addition number of propylene oxide: 6) manufactured by NOF Corporation. Benzoyl peroxide used in Example 5 was a reagent manufactured by Wako Pure Chemical Industries, Ltd. Percumyl D used in Example 6 was dicumyl peroxide manufactured by NOF Corporation.

TABLE 1

| | Examples | | | | | |
|---|---|---|---|---|---|---|
| | 1 | 2 | 3 | 4 | 5 | 6 |
| REACTION 1 Initial Charge (part) | | | | | | |
| MSD | 50 | 30 | 30 | 10.7 | 50 | 50 |
| ethylene glycol monobutyl ether | 50 | 30 | 30 | 8.8 | 50 | 50 |
| Added Mixture (part) | | | | | | |
| methacrylic acid | 42.6 | 51.1 | 60.1 | 7 | 42.6 | 42.6 |
| NK Ester EH-4E | 12.5 | — | — | — | 12.5 | 12.5 |
| Blenmer 50POEP-800B | — | 15 | — | — | — | — |
| benzyl methacrylate | 100 | 120 | 126 | — | 100 | 100 |
| isobornyl methacrylate | — | — | — | 37.5 | — | — |
| styrene macromer A | — | — | — | 105 | — | — |
| ethylene glycol monobutyl ether | 12.6 | 36 | 26.8 | 1.9 | 12.6 | 12.6 |
| Perhexyl D | 4.6 | 4.8 | 4.1 | 2.2 | — | — |
| benzoyl peroxide | — | — | — | — | 4.6 | — |
| Percumyl D | — | — | — | — | — | 4.6 |
| Diluent (part) | | | | | | |
| ethylene glycol monobutyl ether | 147 | 154.9 | 133.4 | — | 147 | 147 |
| REACTION 2 Initial Charge (part) | | | | | | |
| polymer solution of Reaction 1 | 75 | 90 | 90 | 173.1 | 75 | 75 |
| Added Mixture (part) | | | | | | |
| methacrylic acid | 29.9 | 34.6 | 38.6 | 8 | 29.9 | 29.9 |
| NK Ester EH-4E | 10.3 | — | — | 7.5 | 10.3 | 10.3 |
| Blenmer 50POEP-800B | — | 11.9 | — | — | — | — |
| benzyl methacrylate | 82.1 | 95.55 | 93.6 | — | 82.1 | 82.1 |
| isobornyl methacrylate | — | — | — | 37.5 | — | — |
| styrene macromer A | 187.1 | 240 | 240 | — | 187.1 | 187.1 |
| ethylene glycol monobutyl ether | 50.4 | 41.8 | 50.2 | 33.9 | 50.4 | 50.4 |
| V-59 | 2.7 | 3.2 | 3 | 1.5 | — | — |
| benzoyl peroxide | — | — | — | — | 4.6 | — |
| Percumyl D | — | — | — | — | — | 4.6 |
| Diluent (part) | | | | | | |
| ethylene glycol monobutyl ether | 87.5 | 103.4 | 85.1 | 67.3 | 87.5 | 87.5 |
| DISPERSING TREATMENT Charge (part) | | | | | | |
| polymer solution of Reaction 2 | 37.8 | 37.1 | 38.6 | 40.4 | 37.8 | 37.8 |
| methyl ethyl ketone | 75.2 | 76 | 74.9 | 72.3 | 75.2 | 75.2 |
| 5 N aq. solution of NaOH | 5.3 | 6.6 | 7.9 | 4.4 | 5.3 | 5.3 |
| 25% aq. solution of ammonia | 1.1 | 1 | 1.1 | 0.6 | 1.1 | 1.1 |
| ion-exchanged water | 260.5 | 260 | 259.4 | 260.9 | 260.5 | 260.5 |
| carbon black | 80 | 80 | 80 | 80 | 80 | 80 |
| Diluent (part) | | | | | | |
| ion-exchanged water | 214.6 | 215 | 215.6 | 214 | 214.6 | 214.6 |
| Concentration (%) of effective ingredients in polymer solution of Reaction 2 | 52.9 | 53.9 | 51.9 | 49.5 | 52.9 | 51.3 |

EXAMPLE 7

Into 5.3 parts of α-methylstyrene dimer, 3.2 parts of methacrylic acid, 1.1 parts of NK Ester EH-4E, 9.2 parts of benzyl methacrylate and 21 parts of ethylene glycol monobutyl ether charged in a flask, a mixture of 17.9 parts of methacrylic acid, 6.4 parts of NK Ester EH-4E, 52.3 parts of benzyl methacrylate, 83.2 parts of styrene macromer A (72.16% purity), 23.9 parts of ethylene glycol monobutyl ether and 3.5 parts of V-59 was added dropwise over 6 h at 120° C. under stirring while blowing nitrogen gas into the contents.

After 30 min from the completion of addition, a mixture of 0.9 parts of V-59 and 18 parts of ethylene glycol monobutyl ether was added dropwise over one hour at the same temperature. The mixture was aged for 30 min, added with 73.6 parts of ethylene glycol monobutyl ether, and then cooled, to obtain a polymer solution having a solid content of 51.5%. The molecular weights of the polymer were measured in the same manner as in Example 1. The weight-average molecular weight was 9,691, and the number-average molecular weight was 3,214 (molecular weight distribution: 3.02).

To 37.8 parts of the polymer solution obtained above, 38.8 parts of methyl ethyl ketone, 5.3 parts of a 5 N aqueous solution of sodium hydroxide, 1.1 parts of a 25% aqueous solution of ammonia, 260.5 parts of ion-exchanged water and 80 parts of carbon black (Monarch 880 manufactured by Cabot Corporation) were added. The resultant mixture was mixed using Disper blades at 15° C. for one hour, and then added with 214.6 parts of ion-exchanged water. The obtained mixture was subjected to a dispersing treatment by passing through a microfluidizer (manufactured by Microfluidics Co., Ltd.) 15 times under 180 MPa.

In the same manner as in Example 1, the obtained dispersion was made into a water dispersion, 20% solid content, of pigment-containing vinyl polymer particles and a water-based ink.

EXAMPLE 8

Into 5.3 parts of α-methylstyrene dimer and 15.8 parts of ethylene glycol monobutyl ether charged in a flask, a mixture of 22.5 parts of methacrylic acid, 15 parts of NK Ester EH-4E, 82.5 parts of benzyl methacrylate, 60 parts of styrene macromer A and 3.4 parts of Perhexyl D was added dropwise over 9 h at 160° C. under stirring while blowing nitrogen gas into the contents.

After aging for 30 min, the mixture was added with 112.8 parts of ethylene glycol monobutyl ether and then cooled, to obtain a polymer solution having a solid content of 50.1%. The molecular weights of the polymer were measured in the same manner as in Example 1. The weight-average molecular weight was 7,820, and the number-average molecular weight was 2,272 (molecular weight distribution: 3.44).

To 40 parts of the polymer solution obtained above, 73.1 parts of methyl ethyl ketone, 5.6 parts of a 5 N aqueous solution of sodium hydroxide, 1.2 parts of a 25% aqueous solution of ammonia, 260.4 parts of ion-exchanged water and 80 parts of carbon black (Monarch 880 manufactured by Cabot Corporation) were added. The resultant mixture was mixed using Disper blades at 15° C. for one hour, added with 214.6 parts of ion-exchanged water, and then subjected to a dispersing treatment by passing through a microfluidizer (manufactured by Microfluidics Co., Ltd.) 15 times under 180 MPa.

In the same manner as in Example 1, the obtained dispersion was made into a water dispersion, 20% solid content, of pigment-containing vinyl polymer particles and a water-based ink.

COMPARATIVE EXAMPLE 1

Into 0.15 parts of 2-mercaptoethanol, 0.75 parts of NK Ester EH-4E, 6.2 parts of benzyl methacrylate and 12 parts of styrene macromer A charged in a flask, a mixture of 1.35 parts of 2-mercaptoethanol, 21 parts of methacrylic acid, 6.8 parts of NK Ester EH-4E, 55.4 parts of benzyl methacrylate, 108 parts of styrene macromer A, 1.4 parts of V-65 and 7.5 parts of methyl ethyl ketone was added dropwise over 5 h at 70° C. under stirring while blowing nitrogen gas into the contents.

After 30 min from the completion of addition, a mixture of 1.8 parts of V-65 and 45 parts of methyl ethyl ketone was added dropwise over 6 h at the same temperature. The mixture was aged for one hour at 80° C., added with 42.2 parts of methyl ethyl ketone, and then cooled, to obtain a polymer solution having a solid content of 35.2%. The molecular weights of the polymer were measured in the same manner as in Example 1. The weight-average molecular weight was 26,905, and the number-average molecular weight was 4,325 (molecular weight distribution: 6.22).

To 56.9 parts of the polymer solution obtained above, 56.2 parts of methyl ethyl ketone, 5.4 parts of a 5 N aqueous solution of sodium hydroxide, 1.1 parts of a 25% aqueous solution of ammonia, 260.4 parts of ion-exchanged water and 80 parts of carbon black (Monarch 880 manufactured by Cabot Corporation) were added. The resultant mixture was mixed using Disper blades at 15° C. for one hour, and then added with 215 parts of ion-exchanged water. The obtained mixture was subjected to a dispersing treatment by passing through a microfluidizer (manufactured by Microfluidics Co., Ltd.) 15 times under 180 MPa.

In the same manner as in Example 1, the obtained dispersion was made into a water-based ink.

The relative amounts of MSD, the polymerization initiator and the monomers used in the preparation of vinyl polymers in Examples 1 to 8 and Comparative Example 1 are shown together in Tables 2-1 and 2-2. The amount of each monomer is given by a weight percentage in the monomer mixture, and the amount of MSD is given by a weight percentage based on the amount of the monomer mixture.

TABLE 2-1

| | Examples | | | | |
|---|---|---|---|---|---|
| | 1 | 2 | 3 | 4 | 5 |
| Chain transfer agent (% based on monomer mixture) | | | | | |
| MSD | 3.5 | 2 | 2.5 | 7.2 | 3.5 |
| Polymerization initiator (% based on monomer mixture) | | | | | |
| Perhexyl D | 0.3 | 0.3 | 0.3 | 1 | — |
| V-59 | 1 | 0.9 | 0.9 | 0.5 | — |
| benzoyl peroxide | — | — | — | — | 2 |

TABLE 2-1-continued

|  | Examples | | | | |
| --- | --- | --- | --- | --- | --- |
|  | 1 | 2 | 3 | 4 | 5 |
| Percumyl D | — | — | — | — | — |
| V-65 | — | — | — | — | — |
| Monomer composition (%) | | | | | |
| (a) methacrylic acid | 15 | 15 | 18 | 10 | 15 |
| (b) styrene macromer A | 40 | 40 | 40 | 35 | 40 |
| (c) benzyl methacrylate | 40 | 40 | 42 | — | 40 |
| (c) isobornyl methacrylate | — | — | — | 50 | — |
| (e) NK Ester EH-4E | 5 | — | — | 5 | 5 |
| (e) Blenmer 50POEP-800B | — | 5 | — | — | — |
| Weight-average molecular weight | 9150 | 13948 | 11737 | 5381 | 9500 |
| Number-average molecular weight | 3316 | 4260 | 3378 | 2264 | 3420 |
| Molecular weight distribution | 2.76 | 3.27 | 3.47 | 2.38 | 2.78 |

TABLE 2-2

|  | Examples | | | Comparative |
| --- | --- | --- | --- | --- |
|  | 6 | 7 | 8 | Example 1 |
| Chain transfer agent (% based on monomer mixture) | | | | |
| MSD | 3.5 | 3.5 | 3.5 | — |
| Polymerization initiator (% based on monomer mixture) | | | | |
| Perhexyl D | — | — | 3.1 | — |
| V-59 | — | 3.1 | — | — |
| benzoyl peroxide | — | — | — | — |
| Percumyl D | 2 | — | — | — |
| V-65 | — | — | — | 1 |
| Monomer composition (%) | | | | |
| (a) methacrylic acid | 15 | 14 | 15 | 14 |
| (b) styrene macromer A | 40 | 40 | 20 | 40 |
| (c) benzyl methacrylate | 40 | 41 | 55 | 41 |
| (c) isobornyl methacrylate | — | — | — | — |
| (e) NK Ester EH-4E | 5 | 5 | 10 | 5 |
| (e) Blenmer 50POEP-800B | — | — | — | — |
| Weight-average molecular weight | 8500 | 9691 | 7820 | 26905 |
| Number-average molecular weight | 2200 | 3214 | 2272 | 4325 |
| Molecular weight distribution | 3.86 | 3.02 | 3.44 | 6.22 |

Methods of Evaluation

The water-based inks obtained in Examples 1 to 8 and Comparative Example 1 were evaluated for the optical density, jetting properties and highlighter-fastness by the following methods. The results are shown in Table 3.

TABLE 3

|  | Optical density | Jetting properties | Highlighter-fastness |
| --- | --- | --- | --- |
| Examples | | | |
| 1 | ⊚ | ⊚ | ○ |
| 2 | ⊚ | ⊚ | ○ |
| 3 | ○ | ⊚ | ○ |
| 4 | ⊚ | ○ | ○ |
| 5 | ⊚ | ⊚ | ⊚ |
| 6 | ⊚ | ⊚ | ⊚ |
| 7 | ○ | ⊚ | ○ |
| 8 | ⊚ | ⊚ | ○ |
| Comparative Example | | | |
| 1 | ○ | X | Δ |

(1) Optical Density

A solid printing was made on an ordinary paper 4200 (ordinary paper manufactured by Xerox Co. Ltd.) in a standard mode using an inkjet printer manufactured by Canon Inc. ("Pixus 5601," trade name). After allowed to stand at 25° C. for 24 h, the optical density was measured using a Macbeth RD914 (manufactured by Macbeth), and evaluated according to the following criteria:

⊚: optical density of 1.4 or greater

○: optical density of 1.2 or greater and smaller than 1.4

Δ: optical density of 1.0 or greater and smaller than 1.2 x: optical density smaller than 1.0

(2) Jetting Properties

Using a printer manufactured by Canon Inc. ("Pixus 5601," trade name), a prescribed pattern was printed on 30 sheets of paper HR-101s (high resolution paper manufactured by Canon Inc.) in a standard mode. The quality of the printed pattern was evaluated according to the following criteria:

⊚: printed clearly with no difference between first print and 30th print

○: printed clearly with almost no difference between first print and 30th print
Δ: slight deformation of pattern in 30th print
x: marked deformation of pattern in 30th print (3) Highlighter-Fastness A standard pattern J5/ver. 1 (Japan Electronics and Information Technology Industries Association) was printed on an ordinary paper 4024 (manufactured by Xerox Co. Ltd.) in a standard mode using an inkjet printer manufactured by Canon Inc. ("Pixus 5601," trade name). After allowed to stand at 25° C. for 24 h, the characters in the standard pattern were traced once with a fluorescent marking pen "Beamliner S" manufactured by Zebra Co., Ltd., and the degree of blur of the characters was visually evaluated according to the following criteria:

⊚: no blur
○: almost no blur
Δ: noticeable blur but legible
x: significant blur and illegible As seen from the results in Table 3, the water-based inks are excellent in the jetting properties when formulated using the polymer prepared by the polymerization of the monomer mixture in the presence of α-methylstyrene dimer. This can be attributable to the function of α-methylstyrene dimer as an addition/cleavage-type chain transfer agent, which makes the polymer uniform and makes the polymer ends hydrophobic. In addition, the water-basted inks are excellent in the highlighter-fastness when formulated using the polymer prepared by the polymerization of the monomer mixture in the presence of the aromatic ring-containing polymerization initiator and α-methylstyrene dimer. This can be attributable to both ends of polymer which are made hydrophobic.

EXAMPLE 9

A water-based ink was prepared in the same manner as in Example 8 except for changing the reaction temperature to 140° C.

EXAMPLE 10

A water-based ink was prepared in the same manner as in Example 8 except for changing the initial concentration of MSD to 30% by weight by charging 12.4 parts of ethylene glycol monobutyl ether.

EXAMPLE 11

A water-based ink was prepared in the same manner as in Example 8 except for changing the concentration of polymerization initiator (Perhexyl D) to 1.0% by weight.

EXAMPLE 12

A water-based ink was prepared in the same manner as in Example 8 except for changing the dropping speed of the monomer mixture to 4.8 g/h.

The dropping speed (g/h) means the weight (g) of the monomer and the macromer in the monomer mixture added per one hour and per 1.0 g of MSD in the reactor.

Methods of Evaluation

The water-based inks prepared in Examples 8 to 12 were evaluated for the starving properties and the scorching properties by the following methods. The results are shown in Table 4.

TABLE 4

|  | Example | | | | |
| --- | --- | --- | --- | --- | --- |
|  | 8 | 9 | 10 | 11 | 12 |
| Conditions of Synthesis | | | | | |
| reaction temperature (° C.) | 160 | 140 | 160 | 160 | 160 |
| initial concentration of MSD (%) | 25 | 25 | 30 | 25 | 25 |
| concentration of polymerization initiator (%) | 2.3 | 2.3 | 2.3 | 1.0 | 2.3 |
| dropping speed of monomers (g/h) | 3.2 | 3.2 | 3.2 | 3.2 | 4.8 |
| Polymer Synthesized | | | | | |
| weight-average molecular weight | 7820 | 8230 | 7640 | 7780 | 8560 |
| number-average molecular weight | 2270 | 2210 | 2170 | 2290 | 2250 |
| molecular weight distribution | 3.44 | 3.72 | 3.52 | 3.40 | 3.80 |
| Results of Evaluation | | | | | |
| starving property | ⊚ | ○ | ○ | ○ | ○ |
| scorching property | ⊚ | ○ | ⊚ | ⊚ | ○ |

(4) Starving Properties

Using each of the water-based inks prepared in Examples 8 to 12, a solid printing was made on 10 sheets of ordinary paper 4024 manufactured by Xerox Co. Ltd. in a standard mode using an inkjet printer manufactured by Canon Inc. ("Pixus 560i," trade name). The quality of the solid image printed on the 10th sheet was visually observed immediately after starting the printing and evaluated according to the following criteria. The method of evaluating the starving properties is not limited to the above method. The term "starving" means the occurrence of white streaks in printed images due to the running out of ink which is caused when the ink supply from an ink cartridge is deficient immediately after starting the printing.

⊚: no white streak in solid image
○: almost no white streak in solid image
Δ: some white streaks in solid image
x: significant white streaks in solid image (5) Scorching Properties Using each of the water-based inks prepared in Examples 8 to 12, a prescribed text pattern was printed on 200 sheets of 4024 paper manufactured by Xerox Co. Ltd. using an inkjet printer "Deskjet 5551" manufactured by Hewlett-Packard Company. The heater of the ink cartridge was observed under a microscope, and the degree of scorching of ink was evaluated according to the following criteria. The method of evaluating the scorching properties is not limited to the above method.

⊚: slight scorching
○: faint scorching on entire face
x: significant scorching

EXAMPLE 13

In the same manner as in Example 8 except for using 80 parts of Cyanine Blue A-334 (manufactured by Dainichiseika Color & Chemicals Mfg. Co., Ltd.) in place of 80 parts of carbon black (Monarch 880 manufactured by Cabot Corporation), a water dispersion, 20% solid content, of pigment-containing vinyl polymer particles and a water-based ink were prepared.

EXAMPLE 14

In the same manner as in Example 8 except for using 80 parts of Fast Yellow 7414 (manufactured by Sanyo Color Works, Ltd.) in place of 80 parts of carbon black (Monarch 880 manufactured by Cabot Corporation), a water dispersion, 20% solid content, of pigment-containing vinyl polymer particles and a water-based ink were prepared.

EXAMPLE 15

In the same manner as in Example 8 except for using 80 parts of Lionogen Magenta (manufactured by Toyo Ink Mfg. Co., Ltd.) in place of 80 parts of carbon black (Monarch 880 manufactured by Cabot Corporation), a water dispersion, 20% solid content, of pigment-containing vinyl polymer particles and a water-based ink were prepared.

Evaluation

The water-based inks obtained in Examples 13-15 were evaluated for the optical density, starving properties and scorching properties in the same manner as described above. The results are shown in Table 5.

TABLE 5

| | Examples | | |
|---|---|---|---|
| | 13 | 14 | 15 |
| Polymer Synthesized | | | |
| weight-average molecular weight | 7820 | 7820 | 7820 |
| number-average molecular weight | 2270 | 2270 | 2270 |
| molecular weight distribution | 3.44 | 3.44 | 3.44 |
| Results of Evaluation | | | |
| optical density | ○ | ○ | ○ |
| starving property | ⊚ | ⊚ | ⊚ |
| scorching property | ⊚ | ⊚ | ⊚ |

INDUSTRIAL APPLICABILITY

The water dispersions of the present invention are advantageously used for the production of water-based inks for inkjet printings. In particular, the water-based inks for inkjet printings of the present invention are advantageously used in thermal inkjet printings.

The invention claimed is:

1. A process for producing a water dispersion for inkjet printing which comprises:
   step 1 of adding a monomer mixture to an organic solvent containing α-methylstyrene dimer at a rate of from 0.5 to 20 g/h per one gram of the α-methylstyrene dimer, to polymerize the monomer mixture in the presence of the α-methylstyrene dimer, to synthesize a polymer whereby at least a portion of the α-methylstyrene dimer is incorporated into the main chain of the polymer;
   step 2 of mixing the polymer obtained in the step 1, a colorant, an organic solvent and water and then subjecting a resulting mixture to a dispersing treatment, to obtain a dispersion of polymer particles containing the colorant; and
   step 3 of removing the organic solvent from the dispersion obtained in the step 2.

2. The process according to claim 1, wherein a polymerization temperature in the step 1 is from 100 to 200° C.

3. The process according to claim 1, wherein the polymerization of the step 1 is performed in the presence of from 1 to 30 parts by weight of the α-methylstyrene dimer per 100 parts by weight of the monomer mixture.

4. The process according to claim 1, wherein the polymerization of the step 1 is performed in the presence of an aromatic ring-containing polymerization initiator in addition to the α-methylstyrene dimer.

5. The process to claim 1, wherein the polymer constituting the polymer particles has an aromatic group of an α-methylstyrene dimer unit at least at one end of the main chain of the polymer.

6. The process of claim 5, wherein the polymer has an aromatic group at both ends of the main chain.

7. The process according to claim 1, wherein the monomer mixture comprises (a) a monomer having a salt-forming group, (b) a macromer, and (c) a hydrophobic monomer.

* * * * *